United States Patent
Chen et al.

(10) Patent No.: US 11,240,694 B2
(45) Date of Patent: Feb. 1, 2022

(54) SIGNAL REPORTING METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventors: Wenhong Chen, Guangdong (CN); Zhi Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 15 days.

(21) Appl. No.: 16/644,945

(22) PCT Filed: Sep. 7, 2017

(86) PCT No.: PCT/CN2017/100947
§ 371 (c)(1),
(2) Date: Mar. 5, 2020

(87) PCT Pub. No.: WO2019/047122
PCT Pub. Date: Mar. 14, 2019

(65) Prior Publication Data
US 2021/0044992 A1    Feb. 11, 2021

(51) Int. Cl.
*H04W 24/10* (2009.01)
*H04L 5/00* (2006.01)
*H04W 24/08* (2009.01)

(52) U.S. Cl.
CPC ........... *H04W 24/10* (2013.01); *H04L 5/0048* (2013.01); *H04W 24/08* (2013.01)

(58) Field of Classification Search
None
See application file for complete search history.

(56) References Cited

U.S. PATENT DOCUMENTS

| 8,233,912 | B2 | 7/2012 | Taaghol |
| 9,554,325 | B2 | 1/2017 | Suga |

(Continued)

FOREIGN PATENT DOCUMENTS

| CN | 101677306 A | 3/2010 |
| CN | 101873629 A | 10/2010 |

(Continued)

OTHER PUBLICATIONS

Qualcomm, Beam management for NR, 3GPP TSG RAN1 #89 R1-1708586 Hangzhou, P.R. China, May 15-19, 2017.

(Continued)

*Primary Examiner* — Chi H Pham
*Assistant Examiner* — Raul Rivas
(74) *Attorney, Agent, or Firm* — Perkins Coie LLP (57) ABSTRACT

Provided by the embodiments of the present application are a signal reporting method, a terminal device, and a network device, which may improve system performance, the method comprising: a terminal device measuring N first signals to obtain a corresponding measurement result and measuring M second signals to obtain a corresponding measurement result, wherein N≥1 and M≥1; the terminal device determining a signal that needs to be reported according to the measurement result of the N first signals and the measurement result of the M second signals.

10 Claims, 3 Drawing Sheets

200

A terminal device measures N first signals to obtain a corresponding measurement result, and measures M second signals to obtain a corresponding measurement result, where N≥1 and M≥1 — S210

The terminal device determines, based on the measurement result of the N first signals and the measurement result of the M second signals, signals that need to be reported — S220

(56) References Cited

U.S. PATENT DOCUMENTS

| | | | |
|---|---|---|---|
| 2013/0322376 A1* | 12/2013 | Marinier et al. | H04L 5/0057 |
| 2015/0208269 A1 | 7/2015 | Damnjanovic et al. | |
| 2016/0043843 A1 | 2/2016 | Liu et al. | |
| 2016/0134408 A1 | 5/2016 | Kim et al. | |
| 2016/0149679 A1 | 5/2016 | Frenne et al. | |
| 2016/0211902 A1 | 7/2016 | Park et al. | |
| 2016/0212643 A1 | 7/2016 | Park et al. | |
| 2017/0126288 A1 | 5/2017 | Sandhu et al. | |
| 2017/0238323 A1 | 8/2017 | Marinier et al. | |
| 2018/0034525 A1 | 2/2018 | Park et al. | |
| 2018/0288755 A1* | 10/2018 | Liu et al. | H04L 5/005 |
| 2018/0343046 A1 | 11/2018 | Park et al. | |

FOREIGN PATENT DOCUMENTS

| | | |
|---|---|---|
| CN | 103220119 A | 7/2013 |
| CN | 103546207 A | 1/2014 |
| CN | 103581997 A | 2/2014 |
| CN | 104185207 A | 12/2014 |
| CN | 104796930 A | 7/2015 |
| CN | 106341171 A | 1/2017 |
| EP | 3255813 A1 | 12/2017 |
| EP | 3382903 A1 | 10/2018 |
| JP | 2020519145 A | 6/2020 |
| KR | 20130027946 A | 3/2013 |
| RU | 2523030 C2 | 7/2014 |
| WO | 2015060680 A2 | 4/2015 |
| WO | 2016126099 A1 | 8/2016 |
| WO | 2017010721 A1 | 1/2017 |
| WO | 2017090987 A1 | 6/2017 |
| WO | 2018201497 A1 | 11/2018 |

OTHER PUBLICATIONS

Nokia, Alcatel-Lucent Shanghai Bell, Reference signals and measurements for beam management and mobility, 3GPP TSG RAN WG1#89 R1-1708904 Hangzhou, P.R. China May 15-19, 2017.
English translation of the Written Opinion of the International Search Authority in the international application No. PCT/CN2017/100947, dated Mar. 21, 2018.
First Office Action of the Russian application No. 2020112798, dated Nov. 23, 2020.
International Search Report in the international application No. PCT/CN2017/100947, dated Mar. 21, 2018.
Supplementary International Search Report in the international application No. PCT/CN2017/100947, dated Oct. 22, 2019.
Office Action of the Indian application No. 202017015036, dated May 17, 2021.
3GPP TSG RAN WG1 Meeting #90 R1-1713594, Prague, Czech, Aug. 21-25, 2017; Agenda item: 6.1.2.2.4; Source: Samsung; Title: Measurement and reporting for beam management.
3GPP TSG RAN WG1 Meeting #90 R1-1712297, Prague, Czechia, Aug. 21-25, 2017; Source: ZTE; Title: Discussion on beam measurement and reporting.
First Office Action of the Korean application No. 10-2020-7007904, dated May 27, 2021.
First Office Action of the Canadian application No. 3075183, dated Apr. 12, 2021.
First Office Action of the Chinese application No. 202010317255.6, dated Jun. 25, 2021.
3GPP TSG RAN WG1 #90 R1-1712671, Prague, P R. Czech, Aug. 21-25, 2017, Agenda Item: 6.1.2.2.4, Source Lenovo, Motorola Mobility, Title: DL beam measurement and reporting, Document for: Discussion. 5 pages.
First Office Action of the Japanese application No. 2020-513691, dated Jul. 30, 2021. 11 pages with English translation.
First Written Opinion of the Singaporean application No. 11202002051P, dated Sep. 6, 2021. 8 pages.

* cited by examiner

SIGNAL REPORTING METHOD, TERMINAL DEVICE, AND NETWORK DEVICE

CROSS-REFERENCE TO RELATED APPLICATIONS

The present application is a U.S. National Phase Entry of International PCT Application No. PCT/CN2017/100947 filed on Sep. 7, 2017, and named after "SIGNAL REPORTING METHOD, TERMINAL DEVICE, AND NETWORK DEVICE", the content of which is hereby incorporated by reference in its entirety.

BACKGROUND

Technical Field

This application relates to the communications field, and more specifically, to a signal reporting method, a terminal device, and a network device.

Related Art

In a 5G multi-beam (multi-beam) system, a terminal device may measure one type of reference signal, and determine, based on a measurement result, signals having relatively good quality, namely, signals whose beams for transmitting the signals have relatively good transmission quality. Therefore, the terminal device may report information about the signals, such as beam information or measurement results, to a network device.

However, a plurality of types of reference signals may be configured for the terminal device on a network. For the terminal device, how to determine, based on the plurality of types of reference signals, determining a signal that needs to be reported, that is, selecting a beam, is a problem that needs to be resolved urgently.

SUMMARY

Embodiments of this application provide a signal reporting method, a terminal device, and a network device, to determine, based on at least two types of signals, a signal that needs to be reported.

According to a first aspect, a signal reporting method is provided, and the signal reporting method includes:

measuring, by a terminal device, N first signals to obtain a corresponding measurement result, and measuring M second signals to obtain a corresponding measurement result, where N≥1 and M≥1; and determining, by the terminal device based on the measurement result of the N first signals and the measurement result of the M second signals, signals that need to be reported.

Therefore, according to the signal reporting method in this embodiment of this application, the terminal device can determine, based on the measurement results of at least two types of signals, the signals that need to be reported. That is, the terminal device can select a beam based on the measurement results of the at least two types of signals.

Optionally, in this embodiment of this application, the method further includes:

sending, by the terminal device to a network device, information about the determined signals that need to be reported.

For example, the terminal device may report information about a beam corresponding to K signals that needs to be reported, or may report a measurement result corresponding to the K signals, provided that the network device can determine the K signals based on the reported information. This is not especially limited in this embodiment of this application.

With reference to the first aspect, in some implementations of the first aspect, the method further includes:

receiving, by the terminal device, first configuration information sent by a network device, where the first configuration information is used to configure the terminal device to measure the first signals and the second signals.

For example, the network device may send the first configuration information to the terminal device by using semi-static signaling (for example, Radio Resource Control (Radio Resource Control, RRC) signaling) or dynamic signaling (for example, downlink control information (Downlink Control Information, DCI)). A manner of sending the first configuration information is not limited in this embodiment of this application.

With reference to the first aspect, in some implementations of the first aspect, the determining, by the terminal device based on the measurement result of the N first signals and the measurement result of the M second signals, signals that need to be reported includes:

determining, by the terminal device, $K_1$ first signals in the N first signals based on the measurement result of the N first signals, and determining $K_2$ second signals in the M second signals based on the measurement result of the M second signals, where the signals that need to be reported include the $K_1$ first signals and the $K_2$ second signals.

For example, the terminal device may determine $K_1$ first signals having optimal transmission quality in the N first signals based on the measurement result of the N first signals. That is, the $K_1$ first signals are $K_1$ first signals having optimal transmission quality in the N first signals.

In other words, the network device may configure the terminal device to separately compare measurement results of types of signals, to determine a quantity of signals that need to be reported in each type of signal.

With reference to the first aspect, in some implementations of the first aspect, the method further includes:

receiving, by the terminal device, second configuration information sent by the network device, where the second configuration information is used to configure the terminal device to determine the $K_1$ first signals in the N first signals based on the measurement result of the N first signals, and determine the $K_2$ second signals in the M second signals based on the measurement result of the M second signals, where $K_1 \leq N$ and $K_2 \leq M$.

With reference to the first aspect, in some implementations of the first aspect, the determining, by the terminal device based on the measurement result of the N first signals and the measurement result of the M second signals, signals that need to be reported includes:

determining, by the terminal device, K signals in the N first signals and the M second signals based on the measurement result of the N first signals and the measurement result of the M second signals, where $1 \leq K \leq N+M$, and the signals that need to be reported include the K second signals.

In other words, the terminal device may compare the measurement results of the two types of signals in a unified manner, and determine the K signals in the N first signals and the M second signals. For example, the terminal device may determine K signals having optimal transmission quality in the N first signals and the M second signals. The K signals may be K first signals or K second signals, or may include the $K_1$ first signals and the $K_2$ second signals, where $K_1+K_2=K$, $K_1>0$, and $K_2>0$.

With reference to the first aspect, in some implementations of the first aspect, the method further includes:

receiving, by the terminal device, third configuration information sent by the network device, where the third configuration information is used to configure the terminal device to determine the K signals in the N first signals and the M second signals based on the measurement result of the N first signals and the measurement result of the M second signals, where $1 \leq K \leq N+M$.

With reference to the first aspect, in some implementations of the first aspect, the determining, by the terminal device based on the measurement result of the N first signals and the measurement result of the M second signals, signals that need to be reported includes:

determining, by the terminal device, $K_1$ first signals in the N first signals based on a first determining condition and the measurement result of the N first signals, and determining $K_2$ second signals in the M second signals based on a second determining condition and the measurement result of the M second signals, where $K_1 \leq N$, $K_2 \leq M$, and the signals that need to be reported include the $K_1$ first signals and the $K_2$ second signals.

In other words, the network device may configure different determining conditions for different signals, so that a signal may be selected based on a corresponding determining condition during signal selection. Optionally, a determining condition corresponding to each type of signal may be the same, or may be different. This is not limited in this embodiment of this application.

With reference to the first aspect, in some implementations of the first aspect, the method further includes:

receiving, by the terminal device, fourth configuration information sent by the network device, where the fourth configuration information is used to configure the terminal device to determine, in the N first signals based on the first determining condition and the measurement result of the N first signals, a first signal that needs to be reported, and determine, in the M second signals based on the second determining condition and the measurement result of the M second signals, a second signal that needs to be reported.

With reference to the first aspect, in some implementations of the first aspect, the first determining condition includes that: a measurement result is greater than or greater than or equal to a first threshold, or a difference between a measurement result and a maximum value of the measurement result of the N first signals is less than or less than or equal to a first difference; and the second determining condition includes that: a measurement result is greater than or greater than or equal to a second threshold, or a difference between a measurement result and a maximum value of the measurement result of the M second signals is less than or less than or equal to a second difference.

With reference to the first aspect, in some implementations of the first aspect, the determining, by the terminal device based on the measurement result of the N first signals and the measurement result of the M second signals, signals that need to be reported includes:

determining, by the terminal device, K second signals in the N first signals and the M second signals based on a third determining condition, the measurement result of the N first signals, and the measurement result of the M second signals, where $1 \leq K \leq N+M$, and the signals that need to be reported include the K second signals.

The network device may configure a same determining condition, namely, the third determining condition, for a plurality of signals. During signal selection, the terminal device may select a signal based on the same determining condition with reference to a measurement result of each signal.

With reference to the first aspect, in some implementations of the first aspect, the method further includes:

receiving, by the terminal device, fifth configuration information sent by the network device, where the fifth configuration information is used to configure the terminal device to determine, in the N first signals and the M second signals based on the third determining condition, the measurement result of the N first signals, and the measurement result of the M second signals, the signals that need to be reported.

With reference to the first aspect, in some implementations of the first aspect, the third determining condition includes that: a measurement result is greater than or greater than or equal to a third threshold, or a difference between a measurement result and a maximum value of the measurement result of the N first signals and the measurement result of the M second signals is less than or less than or equal to a third difference.

With reference to the first aspect, in some implementations of the first aspect, the method further includes:

performing, by the terminal device, joint processing on a measurement result of at least one first signal and a measurement result of at least one second signal to obtain a processed measurement result, where the processed measurement result is a measurement result corresponding to the first signal and the second signal.

With reference to the first aspect, in some implementations of the first aspect, the performing, by the terminal device, joint processing on a measurement result of at least one first signal and a measurement result of at least one second signal to obtain a processed measurement result includes:

determining, by the terminal device, a maximum value of the measurement result of the at least one first signal and the measurement result of the at least one second signal as the processed measurement result.

That is, the terminal device may determine a maximum value of measurement results corresponding to a group of signals having a quasi-co-location, as a measurement result corresponding to the group of signals having the quasi-co-location.

For example, if the at least one first signal includes a first signal, where a measurement result of the first signal is denoted as RSRP 1, the at least one second signal includes a second signal, where a measurement result of the second signal is denoted as RSRP 2, and the measurement result corresponding to the group of signals having the quasi-co-location is denoted as RSRP, RSRP=max (RSRP 1, RSRP 2).

With reference to the first aspect, in some implementations of the first aspect, the performing, by the terminal device, joint processing on a measurement result of at least one first signal and a measurement result of at least one second signal to obtain a processed measurement result includes:

determining, by the terminal device, a minimum value of the measurement result of the at least one first signal and the measurement result of the at least one second signal as the processed measurement result.

That is, the terminal device may determine a minimum value of the measurement result corresponding to a group of signals having a quasi-co-location, as a measurement result corresponding to the group of signals having the quasi-co-location.

For example, if the at least one first signal includes a first signal, where a measurement result of the first signal is denoted as RSRP 1, the at least one second signal includes a second signal, where a measurement result of the second signal is denoted as RSRP 2, and the measurement result corresponding to the group of signals having the quasi-co-location is denoted as RSRP, RSRP=min (RSRP 1, RSRP 2).

With reference to the first aspect, in some implementations of the first aspect, the performing, by the terminal device, joint processing on a measurement result of at least one first signal and a measurement result of at least one second signal to obtain a processed measurement result includes:

determining, by the terminal device, that the processed measurement result is $a*R_1+b*R_2$, where $a>0$, $b>0$, $R_1$ is the measurement result of the first signal, and $R_2$ is the measurement result of the second signal.

That is, the terminal device may determine a result obtained by separately multiplying measurement results corresponding to a group of signals having a quasi-co-location by corresponding coefficients, as a measurement result corresponding to the group of signals having the quasi-co-location.

For example, if the at least one first signal includes a first signal, where a measurement result of the first signal is denoted as RSRP 1, the at least one second signal includes a second signal, where a measurement result of the second signal is denoted as RSRP 2, and the measurement result corresponding to the group of signals having the quasi-co-location is denoted as RSRP, RSRP=$a*R_1+b*R_2$, where $a>0$ and $b>0$.

Optionally, a sum of weighting coefficients for measurement results corresponding to a group of signals having a quasi-co-location is 1.

With reference to the first aspect, in some implementations of the first aspect, a and b are configured for the terminal device by the network device, are determined by the terminal device, or are preset on the terminal device.

With reference to the first aspect, in some implementations of the first aspect, a and b are determined based on at least one of the following: signal bandwidth, signal periods, signal density, resource element RE quantities, or sample quantities of the at least one first signal and the at least one second signal.

With reference to the first aspect, in some implementations of the first aspect, the first signal and the second signal have a quasi-co-location QCL or a spatial quasi-co-location.

For example, the at least one first signal and the at least one second signal are signals that have a quasi-co-location (Quasi-Co-Location, QCL) or a spatial quasi-co-location (Spatial QCL). For example, the at least one first signal and the at least one second signal are sent on a same beam, or sent through a same antenna port.

With reference to the first aspect, in some implementations of the first aspect, the determining, by the terminal device based on the measurement result of the N first signals and the measurement result of the M second signals, signals that need to be reported includes:

determining, by the terminal device based on the processed measurement result, the signals that need to be reported.

With reference to the first aspect, in some implementations of the first aspect, the determining, by the terminal device based on the measurement result of the N first signals and the measurement result of the M second signals, signals that need to be reported includes:

adjusting, by the terminal device, the measurement result of the N first signals and the measurement result of the M second signals based on transmit power of the N first signals and transmit power of the M second signals; and determining, based on the adjusted measurement result of the N first signals and the adjusted measurement result of the M second signals, the signals that need to be reported.

In other words, in this embodiment of this application, the terminal device may directly determine, based on the measurement result of the N first signals and the measurement result of the M second signals, the signals that need to be reported; or may adjust the measurement results based on transmit power of the N signals and transmit power of the M signals, and then determine, based on the adjusted measurement result, the signals that need to be reported.

With reference to the first aspect, in some implementations of the first aspect, the determining, based on the adjusted measurement result of the N first signals and the adjusted measurement result of the M second signals, the signals that need to be reported includes:

comparing, by the terminal device, the adjusted measurement result of the N first signals with the adjusted measurement result of the M second signals, to determine that K signals having optimal quality are the signals that need to be reported, where $1 \leq K \leq N+M$.

With reference to the first aspect, in some implementations of the first aspect, the determining, based on the adjusted measurement result of the N first signals and the adjusted measurement result of the M second signals, the signals that need to be reported includes:

processing, by the terminal device, some or all of the adjusted measurement result of the N first signals and the adjusted measurement result of the M second signals, and determining, based on the processed measurement result of the N first signals and the processed measurement result of the M second signals, the signals that need to be reported.

With reference to the first aspect, in some implementations of the first aspect, the processing, by the terminal device, some or all of the adjusted measurement result of the N first signals and the adjusted measurement result of the M second signals includes:

multiplying, by the terminal device, a first measurement result by a first coefficient, or adding a first offset to the first measurement result, where the first measurement result is any measurement result of the adjusted measurement result of the N first signals, or any measurement result of the adjusted measurement result of the M second signals.

Optionally, the first coefficient is preset on the terminal device, is configured for the terminal device by the network device, or is determined by the terminal device.

Optionally, the first offset is preset on the terminal device, is configured for the terminal device by the network device, or is determined by the terminal device.

Optionally, the measurement result is reference signal received power RSRP.

Optionally, the first signals are channel state information-reference signals CSI-RSs, and the second signals are some or all signals in a synchronization signal block SS Block.

According to a second aspect, a signal reporting method is provided, and the signal reporting method includes:

sending, by a network device, first configuration information to a terminal device, where the first configuration information is used to configure the terminal device to measure a first signal and a second signal; and receiving, by the network device, a reporting result sent by the terminal device, where the reporting result includes information about a signal determined by the terminal device based on a measurement result of N first signals and a measurement result of M second signals, where N≥1 and M≥1.

With reference to the second aspect, in some implementations of the second aspect, the method further includes:

sending, by the network device, second configuration information to the terminal device, where the second configuration information is used to configure the terminal device to determine $K_1$ first signals in the N first signals based on the measurement result of the N first signals, and determine $K_2$ second signals in the M second signals based on the measurement result of the M second signals, where $K_1 \leq N$ and $K_2 \leq M$.

With reference to the second aspect, in some implementations of the second aspect, the method further includes:

sending, by the network device, third configuration information to the terminal device, where the third configuration information is used to configure the terminal device to determine K signals in the N first signals and the M second signals based on the measurement result of the N first signals and the measurement result of the M second signals, where $1 \leq K \leq N+M$.

With reference to the second aspect, in some implementations of the second aspect, the method further includes:

sending, by the network device, fourth configuration information to the terminal device, where the fourth configuration information is used to configure the terminal device to determine, in the N first signals based on a first determining condition and the measurement result of the N first signals, a first signal that needs to be reported, and determine, in the M second signals based on a second determining condition and the measurement result of the M second signals, a second signal that needs to be reported.

With reference to the second aspect, in some implementations of the second aspect, the first determining condition includes that: a measurement result is greater than or greater than or equal to a first threshold, or a difference between a measurement result and a maximum value of the measurement result of the N first signals is less than or less than or equal to a first difference; and the second determining condition includes that: a measurement result is greater than or greater than or equal to a second threshold, or a difference between a measurement result and a maximum value of the measurement result of the M second signals is less than or less than or equal to a second difference.

With reference to the second aspect, in some implementations of the second aspect, the method further includes:

sending, by the network device, fifth configuration information to the terminal device, where the fifth configuration information is used to configure the terminal device to determine, in the N first signals and the M second signals based on a third determining condition, the measurement result of the N first signals, and the measurement result of the M second signals, signals that need to be reported.

With reference to the second aspect, in some implementations of the second aspect, the third determining condition includes that: a measurement result is greater than or greater than or equal to a third threshold, or a difference between a measurement result and a maximum value of the measurement result of the N first signals and the measurement result of the M second signals is less than or less than or equal to a third difference.

According to a third aspect, a terminal device is provided to perform the method according to any one of the first aspect or the possible implementations of the first aspect.

Specifically, the terminal device includes a unit configured to perform the method according to any one of the first aspect the possible implementations of the first aspect.

According to a fourth aspect, a network device is provided to perform the method according to any one of the second aspect or the possible implementations of the second aspect.

Specifically, the network device includes a unit configured to perform the method in according to any one of the second aspect or the possible implementations of the second aspect.

According to a fifth aspect, a terminal device is provided. The terminal device includes: a memory, a processor, an input interface, and an output interface. The memory, the processor, the input interface, and the output interface are connected to each other by using a bus system. The memory is configured to store an instruction. The processor is configured to execute the instruction stored in the memory, to perform the method according to any one of the first aspect or the possible implementations of the first aspect.

According to a sixth aspect, a network device is provided. The network device includes: a memory, a processor, an input interface, and an output interface. The memory, the processor, the input interface, and the output interface are connected to each other by using a bus system. The memory is configured to store an instruction. The processor is configured to execute the instruction stored in the memory, to perform the method according to any one of the second aspect or the possible implementations of the second aspect.

According to a seventh aspect, a computer storage medium is provided, to store a computer software instruction used to perform the method according to any one of the first aspect or the possible implementations of the first aspect, and the computer software instruction includes a program designed to perform the foregoing aspects.

According to an eighth aspect, a computer storage medium is provided, to store a computer software instruction used to perform the method according to any one of the second aspect or the possible implementations of the second aspect, and the computer software instruction includes a program designed to perform the foregoing aspects.

According to a ninth aspect, a computer program product including an instruction is provided. When the computer program product is run on a computer, the computer is enabled to perform the method according to any one of the first aspect or the optional implementations of the first aspect.

According to a tenth aspect, a computer program product including an instruction is provided. When the computer program product is run on a computer, the computer is enabled to perform the method according to any one of the second aspect or the optional implementations of the second aspect.

DETAILED DESCRIPTION

Technical solutions in embodiments of this application are described below with reference to the accompanying drawings in the embodiments of this application.

It should be understood that, the terms "system" and "network" are often interchangeably used in this specification. The term "and/or" in this specification describes only an association relationship for describing associated objects and represents that three relationships may exist. For example, A and/or B may represent: Only A exists, both A and B exist, and only B exists. In addition, the character "/" in this specification generally indicates an "or" relationship between the associated objects.

The technical solutions in the embodiments of this application may be applied to various communications systems, for example, a Global System for Mobile Communications (Global System of Mobile communication, "GSM" for short) system, a Code Division Multiple Access (Code Division Multiple Access, "CDMA" for short) system, a Wideband Code Division Multiple Access (Wideband Code Division Multiple Access, "WCDMA" for short) system, a General Packet Radio Service (General Packet Radio Service, "GPRS" for short) system, a Long Term Evolution (Long Term Evolution, "LTE" for short) system, an LTE Frequency Division Duplex (Frequency Division Duplex, "FDD" for short) system, an LTE Time Division Duplex (Time Division Duplex, "TDD" for short) system, a Universal Mobile Telecommunication System (Universal Mobile Telecommunication System, "UMTS" for short) system, a Worldwide Interoperability for Microwave Access (Worldwide Interoperability for Microwave Access, "WiMAX" for short) communications system, a future 5G system, and the like.

Figure 1:
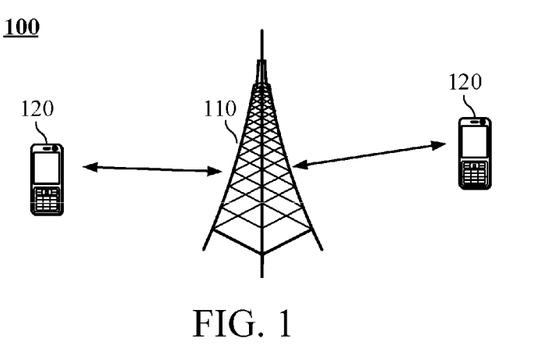
FIG. 1 is a schematic diagram of a communications system according to an embodiment of this application.

FIG. 1 shows a wireless communications system 100 applied according to an embodiment of this application. The wireless communications system 100 may include a network device 110. The network device 100 may be a device that communicates with a terminal device. The network device 100 may provide communication coverage for a specific geographical area, and may communicate with a terminal device (such as UE) located within the coverage area. Optionally, the network device 100 may be a base transceiver station (Base Transceiver Station, BTS) in a GSM system or a CDMA system, or may be a NodeB (NodeB, NB) in a WCDMA system, or may be an evolved NodeB (evolved NodeB, eNB or eNodeB) in an LTE system, or a wireless controller in a cloud radio access network (Cloud Radio Access Network, CRAN). Alternatively, the network device may be a relay station, an access point, an in-vehicle device, a wearable device, a network-side device in a future 5G network, a network device in a future evolved public land mobile network (Public Land Mobile Network, PLMN), or the like.

The wireless communications system 100 further includes at least one terminal device 120 located within a coverage range of the network device 110. The terminal device 120 may be mobile or fixed. Optionally, the terminal device 120 may refer to an access terminal, user equipment (User Equipment, UE), a user unit, a user station, a mobile station, a mobile console, a remote station, a remote terminal, a mobile device, a user terminal, a terminal, a wireless communications device, a user agent, or a user apparatus. The access terminal may be a cellular phone, a cordless phone, a Session Initiation Protocol (English: Session Initiation Protocol, SIP) phone, a wireless local loop (Wireless Local Loop, WLL) station, a personal digital assistant (Personal Digital Assistant, PDA), a handheld device or a computing device having a wireless communications function, another processing device, an in-vehicle device, a wearable device, or the like connected to a wireless modem, a terminal device in a future 5G network, or a terminal device in a future evolved PLMN.

Optionally, a 5G system or network may also be referred to as a new radio (New Radio, NR) system or network.

Optionally, in the communications system 100, the network device may use different beams to transmit different channel state information-reference signals (Channel-State Information-Reference Signal, CSI-RS), or synchronization signal blocks (Synchronization Signal Block, SS Block), and the terminal device may identify different beams based on the different SS Blocks or CSI-RSs, or resources for transmitting the CSI-RSs.

Correspondingly, the terminal device may measure some downlink signals, such as CSI-RSs or signals in an SS Block; determine, based on a measurement result, signals having relatively good transmission quality, namely, signals whose beams for transmitting the signals have relatively good transmission quality; and report information related the determined beams to the network device. For example, the terminal device may measure N signals, select optimal K signals, and then report information about the K signals to the network device, where N is an integer, and $1 <= K < N$.

FIG. 1 shows an example of one network device and two terminal devices. Optionally, the wireless communications system 100 may include a plurality of network devices and within coverage of each network device, there may be another quantity of terminal devices. This is not limited in this embodiment of this application.

Optionally, the wireless communications system 100 may further includes another network entity such as a network controller or a mobility management entity. This is not limited in this embodiment of this application.

Figure 2:
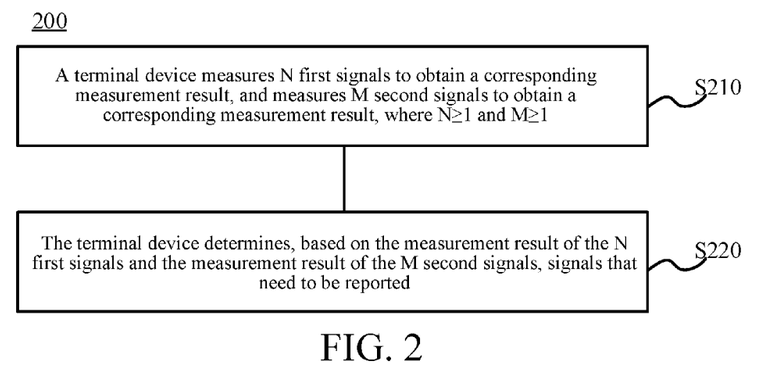
FIG. 2 is a schematic flowchart of a signal reporting method according to an embodiment of this application.

FIG. 2 is a schematic flowchart of a signal reporting method 200 according to an embodiment of this application. The method 200 may be performed by the terminal device in the communications system shown in FIG. 1. As shown in FIG. 2, the method 200 includes the following steps:

S210: The terminal device measures N first signals to obtain a corresponding measurement result, and measures M second signals to obtain a corresponding measurement result, where $N \geq 1$ and $M \geq 1$.

S220: The terminal device determines, based on the measurement result of the N first signals and the measurement result of the M second signals, signals that need to be reported.

Optionally, in this embodiment of this application, the first signals may be CSI-RSs, and the second signals may be some or all signals in an SS Block, for example, primary synchronization signals (Primary Synchronization Signal, PSS) or secondary synchronization signals (Secondary Synchronization Signal, SSS).

Optionally, in this embodiment of this application, the measurement result of the N first signals and the measurement result of the M second signals may be reference signal received power (Reference Signal Received Power, RSRP). For example, the measurement results may be L1 RSRP or layer 3 RSRP, or may be measurement results that can be used for transmission quality comparison. This is not limited in this embodiment of this application.

It should be understood that, the terminal device may further measure P third signals to obtain measurement results corresponding to the P third signals. Further, the terminal device may determine, based on the measurement result of the N first signals, the measurement result of the M second signals, and the measurement results of the P third signals, the signals that need to be reported. In this embodiment of this application, descriptions are provided by using only an example in which the terminal device determines, based on the first signals and the second signals, the signals that need to be reported. The terminal device may alternatively determine, based on more types of signals, such as a third signal and a fourth signal, the signals that need to be reported.

Optionally, in this embodiment of this application, after S220, the method further includes:

sending, by the terminal device to a network device, information about the determined signals that need to be reported.

For example, the terminal device may report information about a beam corresponding to K signals that needs to be reported, or may report a measurement result corresponding to the K signals, provided that the network device can determine the K signals based on the reported information. This is not especially limited in this embodiment of this application.

Optionally, in this embodiment of this application, the method 200 further includes:

receiving, by the terminal device, first configuration information sent by a network device, where the first configuration information is used to configure the terminal device to measure the first signals and the second signals.

That is, the network device may use the first configuration information to configure the terminal device to measure signals, and then determine, based on a measurement result, the signals that need to be reported. For example, the network device may send the first configuration information to the terminal device by using semi-static signaling (for example, Radio Resource Control (Radio Resource Control, RRC) signaling) or dynamic signaling (for example, downlink control information (Downlink Control Information, DCI)). A manner of sending the first configuration information is not limited in this embodiment of this application.

Optionally, in an embodiment, S220 may include:

determining, by the terminal device, $K_1$ first signals in the N first signals based on the measurement result of the N first signals, and determining $K_2$ second signals in the M second signals based on the measurement result of the M second signals, where the signals that need to be reported include the $K_1$ first signals and the $K_2$ second signals.

In other words, the terminal device may separately select signals based on the measurement result of the first signals and the measurement result of the second signals, that is, determine the $K_1$ first signals in the N first signals based on the measurement result of the N first signals. For example, the terminal device may determine $K_1$ first signals having optimal transmission quality in the N first signals based on the measurement result of the N first signals. That is, the $K_1$ first signals are $K_1$ first signals having optimal transmission quality in the N first signals. The terminal device may alternatively determine the $K_2$ second signals in the M second signals based on the measurement result in the M second signals in a similar manner. For brevity, details are not described herein.

Optionally, in some embodiments, the method 200 may further include:

receiving, by the terminal device, second configuration information sent by the network device, where the second configuration information is used to configure the terminal device to determine the $K_1$ first signals in the N first signals based on the measurement result of the N first signals, and determine the $K_2$ second signals in the M second signals based on the measurement result of the M second signals, where $K_1 \leq N$ and $K_2 \leq M$.

That is, the network device may configure, for the terminal device, a manner of selecting the signals that need to be reported. For example, the terminal device compares measurement results of types of signals, to determine respective signals that needs to be reported; or the terminal device may compares all measurement results, and determine, based on all the measurement results, the signals that need to be reported. In this embodiment, the second configuration information may be used to specifically configure the terminal device to separately compare measurement results of types of signals, to determine a quantity of signals that need to be reported for each type of signal.

Optionally, the network device may configure the second configuration information for the terminal device by using dynamic signaling, such as DCI; or the network device may send the second configuration information to the terminal device by using another message or signaling. A manner of sending the second configuration information is not limited in this embodiment of this application.

Optionally, in another embodiment, S220 may include:

determining, by the terminal device, K signals in the N first signals and the M second signals based on the measurement result of the N first signals and the measurement result of the M second signals, where $1 \leq K \leq N+M$, and the signals that need to be reported include the K second signals.

In other words, the terminal device may compare the measurement results of the two types of signals in a unified manner, and determine the K signals in the N first signals and the M second signals. For example, the terminal device may determine K signals having optimal transmission quality in the N first signals and the M second signals. The K signals may be K first signals or K second signals, or may include the $K_1$ first signals and the $K_2$ second signals, where $K_1+K_2=K$, $K_1>0$, and $K_2>0$.

For example, the terminal device may sort the measurement result of the N first signals and the measurement result of the M second signals in a unified manner, and select, based on ranks of the measurement result of the N first signals and the measurement result of the M second signals, the K signals having optimal transmission quality.

Optionally, in some embodiments, the method 200 may further include:

receiving, by the terminal device, third configuration information sent by the network device, where the third configuration information is used to configure the terminal device to determine the K signals in the N first signals and the M second signals based on the measurement result of the N first signals and the measurement result of the M second signals, where $1 \leq K \leq N+M$.

That is, the network device may configure, for the terminal device, a manner of selecting the signals that need to be reported. In this embodiment, the network device may configure the terminal device to compare measurement results of a plurality of types of signals in a unified manner, and determine the signals that need to be reported in the plurality of types of signals. In other words, the network device may configure a quantity of each type of signal that needs to be reported by the terminal device, or may configure a total quantity of a plurality of types of signals that need to be reported.

Optionally, the network device may configure the third configuration information for the terminal device by using dynamic signaling, such as DCI; or the network device may send the third configuration information to the terminal device by using another message or signaling. A manner of sending the third configuration information is not limited in this embodiment of this application.

Optionally, in some embodiments, S220 may specifically include:

determining, by the terminal device, $K_1$ first signals in the N first signals based on a first determining condition and the measurement result of the N first signals, and determining $K_2$ second signals in the M second signals based on a second determining condition and the measurement result of the M second signals, where $K_1 \leq N$, $K_2 \leq M$, and the signals that need to be reported include the $K_1$ first signals and the $K_2$ second signals.

That is, when determining, in the N first signals, the signals that need to be reported, the terminal device may determine, based on the measurement result of the N first signals and the first determining condition, the signals that need to be reported. For example, the first determining condition includes that: a measurement result is greater than or greater than or equal to a first threshold, or a difference between a measurement result and a maximum value of the measurement result of the N first signals is less than or less than or equal to a first difference. For example, the terminal device may determine, in the measurement result of the N first signals based on the first determining condition, that a signal corresponding to a measurement result greater than the first threshold is a signal that needs to be reported; or the terminal device may determine, in the measurement result of the N first signals based on the first determining condition, that a signal corresponding to a measurement result whose difference from a maximum measurement result is less than a first difference is a signal that needs to be reported. Optionally, the second determining condition includes that: a measurement result is greater than or greater than or equal to a second threshold, or a difference between a measurement result and a maximum value of the measurement result of the M second signals is less than or less than or equal to a second difference. A manner in which the terminal device determines, in the M second signals based on the second determining condition, the signals that need to be reported is similar thereto. Details are not described herein again.

The first determining condition and the second determining condition may be the same or different. Specifically, the first threshold and the second threshold may be the same or different, and the first difference and the second difference may be the same or different. This is not limited in this embodiment of this application.

In other words, the network device may configure different determining conditions for different signals, so that a signal may be selected based on a corresponding determining condition during signal selection.

Optionally, in this embodiment of this application, the method 200 further includes:

receiving, by the terminal device, fourth configuration information sent by the network device, where the fourth configuration information is used to configure the terminal device to determine, in the N first signals based on the first determining condition and the measurement result of the N first signals, a first signal that needs to be reported, and determine, in the M second signals based on the second determining condition and the measurement result of the M second signals, a second signal that needs to be reported.

That is, the terminal device may configure a corresponding determining condition for each type of signal. Determining conditions corresponding to types of signals may be the same or different. This is not limited in this embodiment of this application.

In other words, in this embodiment, the network device may configure a selection condition for each type of signal, or the determining condition for each type of signal. A signal that satisfies the selection condition is a signal that needs to be reported.

Optionally, in a specific embodiment, S220 may include:

determining, by the terminal device, K second signals in the N first signals and the M second signals based on a third determining condition, the measurement result of the N first signals, and the measurement result of the M second signals, where $1 \leq K \leq N+M$, and the signals that need to be reported include the K second signals.

In this embodiment, the network device may configure a same determining condition, namely, the third determining condition, for a plurality of signals. During signal selection, the terminal device may perform signal selection based on the same determining condition with reference to a measurement result of each signal. For example, the third determining condition includes that: a measurement result is greater than or greater than or equal to a third threshold, or a difference between a measurement result and a maximum value of the measurement result of the N first signals and the measurement result of the M second signals is less than or less than or equal to a third difference. In other words, the terminal device may determine a signal corresponding to a measurement result that satisfies the third determining condition and that is in the measurement result of the N first signals and the measurement result of the M second signals, as a signal that needs to be reported.

Optionally, in this embodiment, the method 200 further includes:

receiving, by the terminal device, fifth configuration information sent by the network device, where the fifth configuration information is used to configure the terminal device to determine, in the N first signals and the M second signals based on the third determining condition, the measurement result of the N first signals, and the measurement result of the M second signals, the signals that need to be reported.

That is, the terminal device may configure a unified determining condition for a plurality of types of signals. During signal selection, the terminal device may select a signal based on the unified determining condition with reference to a measurement result of each signal in the plurality of types of signals.

Optionally, in another embodiment, the method 200 further includes:

performing, by the terminal device, joint processing on a measurement result of at least one first signal and a measurement result of at least one second signal to obtain a processed measurement result, where the processed measurement result is a measurement result corresponding to the first signal and the second signal.

The at least one first signal and the at least one second signal are signals that have a quasi-co-location (Quasi-Co-Location, QCL) or a spatial quasi-co-location (Spatial QCL). For example, the at least one first signal and the at least one second signal are sent on a same beam, or sent through a same antenna port. In other words, in the N first signals and the M second signals, there may be two or more signals having a quasi-co-location. For example, at least two first signals and one second signal have a QCL, or at least two first signals and at least two second signals may have a QCL. A quantity of signals having a quasi-co-location is not limited in this embodiment of this application.

Optionally, in some embodiments, S220 may include:

determining, by the terminal device based on the processed measurement result, the signals that need to be reported.

Specifically, when a first signal and a second signal have a quasi-co-location, a measurement result of the first signal and a measurement result of the second signal may be processed jointly to obtain the processed measurement results for the two signals, and then the terminal device may evaluate transmission quality of the two signals based on the processed measurement results. In other words, when the signals that need to be reported are determined based on the measurement result of the N first signals and the measurement result of the M second signals, the measurement result of the first signals and the measurement result of the second signals may be replaced with processed measurement results, then transmission quality is compared with reference to a measurement result of another signal, and at least one signal having relatively good transmission quality is selected therefrom. If in the N first signals and the M second signals, there is still another group of signals having a quasi-co-location, measurement results of this group of signals may also be processed jointly to obtain a processed measurement result for this group of signals. During transmission quality comparison, the processed measurement result may be used as the measurement result corresponding to this group of signals.

Optionally, in an embodiment, the performing, by the terminal device, joint processing on a measurement result of at least one first signal and a measurement result of at least one second signal to obtain a processed measurement result includes:

determining, by the terminal device, a maximum value of the measurement result of the at least one first signal and the measurement result of the at least one second signal as the processed measurement result.

That is, the terminal device may determine a maximum value of measurement results corresponding to a group of signals having a quasi-co-location, as a measurement result corresponding to the group of signals having the quasi-co-location.

For example, if the at least one first signal includes a first signal, where a measurement result of the first signal is denoted as RSRP 1, the at least one second signal includes a second signal, where a measurement result of the second signal is denoted as RSRP 2, and measurement results corresponding to a group of signals having a quasi-co-location is denoted as RSRP, RSRP=max (RSRP 1, RSRP 2).

The measurement result RSRP 1 of the first signal and the measurement result RSRP 2 of the second signal may be original measurement results, or may be a result obtained by adjusting transmit power of the first signal and transmit power of the second signal. This is not limited in this embodiment of this application.

Optionally, in another embodiment, the performing, by the terminal device, joint processing on a measurement result of at least one first signal and a measurement result of at least one second signal to obtain a processed measurement result includes:

determining, by the terminal device, a minimum value of the measurement result of the at least one first signal and the measurement result of the at least one second signal as the processed measurement result.

That is, the terminal device may determine a minimum value of measurement results corresponding to a group of signals having a quasi-co-location, as a measurement result corresponding to the group of signals having the quasi-co-location.

For example, if the at least one first signal includes a first signal, where a measurement result of the first signal is denoted as RSRP 1, the at least one second signal includes a second signal, where a measurement result of the second signal is denoted as RSRP 2, and the measurement result corresponding to a group of signals having a quasi-co-location is denoted as RSRP, RSRP=min (RSRP 1, RSRP 2).

Optionally, in still another embodiment, the performing, by the terminal device, joint processing on a measurement result of at least one first signal and a measurement result of at least one second signal to obtain a processed measurement result includes:

determining, by the terminal device, that the processed measurement result is $a*R_1+b*R_2$, where $a>0$, $b>0$, $R_1$ is the measurement result of the first signal, and $R_2$ is the measurement result of the second signal.

That is, the terminal device may determine a result obtained by separately multiplying measurement results corresponding to a group of signals having a quasi-co-location by corresponding coefficients, as a measurement result corresponding to the group of signals having the quasi-co-location.

For example, if the at least one first signal includes a first signal, where a measurement result of the first signal is denoted as RSRP 1, the at least one second signal includes a second signal, where a measurement result of the second signal is denoted as RSRP 2, and the measurement result corresponding to a group of signals having a quasi-co-location is denoted as RSRP, RSRP=$a*R_1+b*R_2$, where $a>0$ and $b>0$.

Optionally, a and b are configured for the terminal device by the network device, are determined by the terminal device, or are preset on the terminal device.

Optionally, a and b are determined based on at least one of the following: signal bandwidth, signal periods, signal density, resource element RE quantities, or sample quantities of the at least one first signal and the at least one second signal.

For example, the terminal device may determine the coefficient a and the coefficient b based on signal bandwidth of the at least one first signal and signal bandwidth of the at least one second signal. For example, when the signal bandwidth of the at least one first signal is greater than the signal bandwidth of the at least one second signal, the terminal device may determine that a value of a is greater than a value of b. Alternatively, the terminal device may determine a and b based on a quantity of REs used to send the first signal and a quantity of REs used to send the second signal. For example, if the quantity of REs occupied by the first signal is greater than the quantity of REs occupied by the second signal, the terminal device may determine that a value of a is greater than a value of b. Alternatively, the terminal device may determine the coefficient a and the coefficient b based on a sample quantity of the at least one first signal and a sample quantity of the at least one second signal. For example, when the sample quantity of the first signal is greater than the sample quantity of the second signal, the terminal device may determine that a value of a is greater than a value of b.

Optionally, in an implementation, a sum of a and b is 1.

In other words, a sum of weighting coefficients of measurement results corresponding to a group of signals having a quasi-co-location is 1.

Optionally, in some embodiments, S220 may include:

adjusting, by the terminal device, the measurement result of the N first signals and the measurement result of the M second signals based on transmit power of the N first signals and transmit power of the M second signals; and determining, based on the adjusted measurement result of the N first signals and the adjusted measurement result of the M second signals, the signals that need to be reported.

In other words, in this embodiment of this application, the terminal device may directly determine, based on the measurement result of the N first signals and the measurement result of the M second signals, the signals that need to be reported; or may adjust the measurement results based on transmit power of the N signals and transmit power of the M signals, and then determine, based on the adjusted measurement result, the signals that need to be reported.

Optionally, in an embodiment, the determining, based on the adjusted measurement result of the N first signals and the adjusted measurement result of the M second signals, the signals that need to be reported includes:

comparing, by the terminal device, the adjusted measurement result of the N first signals with the adjusted measurement result of the M second signals, to determine that K signals having optimal quality are the signals that need to be reported, where $1 \leq K \leq N+M$.

In other words, the terminal device may directly compare the adjusted measurement result, and select the K signals having optimal quality from the N first signals and the M second signals, as the signals that need to be reported. Optionally, for a specific implementation process of determining, based on the adjusted measurement result, the signals that need to be reported, refer to related descriptions in the foregoing embodiments. For example, the adjusted measurement result may be compared separately, or all measurement results may be compared. Specifically, the $K_1$ first signals may be determined in the N first signals based on the adjusted measurement result of the N first signals, and the $K_2$ second signals may be determined in the M second signals based on the adjusted measurement result of the M second signals. Alternatively, the K signals may be determined in the N first signals and the M second signals based on the adjusted measurement result of the N first signals and the adjusted measurement result of the M second signals. The K signals may be K first signals or K second signals, or may include at least one first signal, at least one second signal, and the like.

Optionally, in another embodiment, the determining, based on the adjusted measurement result of the N first signals and the adjusted measurement result of the M second signals, the signals that need to be reported includes:

processing, by the terminal device, some or all of the adjusted measurement result of the N first signals and the adjusted measurement result of the M second signals, and determining, based on the processed measurement result of the N first signals and the processed measurement result of the M second signals, the signals that need to be reported.

In other words, the terminal device may further process some or all of the adjusted measurement result of the N first signals and the adjusted measurement result of the M second signals, and then determine, based on the processed measurement result of the N first signals and the processed measurement result of the M second signals, the signals that need to be reported. For a specific implementation process of determining, based on the processed measurement result of the N first signals and the processed measurement result of the M second signals, the signals that need to be reported, refer to related descriptions in the foregoing embodiments. Details are not described herein again.

Optionally, in some embodiments, the processing, by the terminal device, some or all of the adjusted measurement result of the N first signals and the adjusted measurement result of the M second signals includes:

multiplying, by the terminal device, a first measurement result by a first coefficient, or adding a first offset to the first measurement result, where the first measurement result is any measurement result of the adjusted measurement result of the N first signals, or any measurement result of the adjusted measurement result of the M second signals.

For example, the adjusted measurement result of the N first signals and the adjusted measurement result of the M second signals include the first measurement result. Further processing the first measurement result may be multiplying the first measurement result by the first coefficient, and/or adding the first offset to the first measurement result, and then using the processed first measurement result as a final measurement result of a corresponding first signal. Then, transmission quality of the first signal may be determined based on the processed first measurement result.

Optionally, in this embodiment of this application, the first coefficient is preset on the terminal device, is configured for the terminal device by the network device, or is determined by the terminal device.

Optionally, in this embodiment of this application, the first offset is preset on the terminal device, is configured for the terminal device by the network device, or is determined by the terminal device.

Therefore, according to the signal reporting method in this embodiment of this application, the terminal device may determine, based on measurement results of at least two types of signals, the signals that need to be reported. Because a signal often corresponds to a beam, the network device may determine a corresponding beam based on information about a signal reported by the terminal device, thereby implementing beam selection.

The foregoing describes a signal reporting method according to an embodiment of this application in detail with reference to FIG. 2 from a perspective of the terminal device. The following describes a signal reporting method according to an embodiment of this application in detail with reference to FIG. 3 from a perspective of the network device. It should be understood that, the description from a side of the network device mutually corresponds to the description from a side of the terminal device. For a similar description, refer to the foregoing description. To avoid repetition, details are not described herein again.

Figure 3:
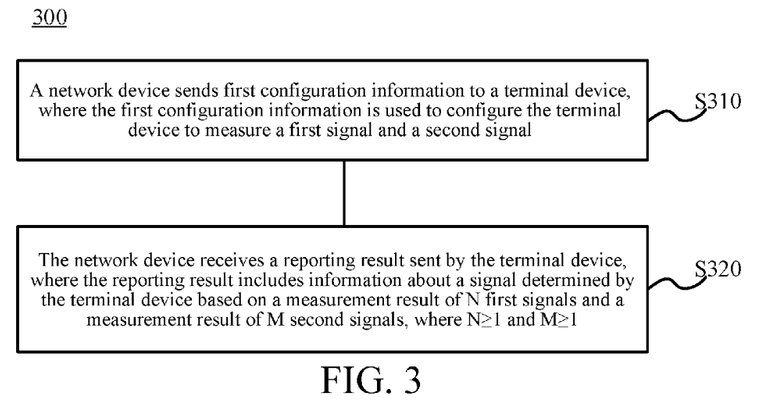
FIG. 3 is a schematic flowchart of a signal reporting method according to another embodiment of this application.

FIG. 3 is a schematic flowchart of a signal reporting method 300 according to another embodiment of this application. The method 300 may be performed by a network device in the communications system shown in FIG. 1. As shown in FIG. 3, the method 300 includes the following content:

S310: The network device sends first configuration information to a terminal device, where the first configuration information is used to configure the terminal device to measure a first signal and a second signal.

S320: The network device receives a reporting result sent by the terminal device, where the reporting result includes information about a signal determined by the terminal device based on a measurement result of N first signals and a measurement result of M second signals, where $N \geq 1$ and $M \geq 1$.

Optionally, in some embodiments, the method 300 further includes:

sending, by the network device, second configuration information to the terminal device, where the second configuration information is used to configure the terminal device to determine $K_1$ first signals in the N first signals based on the measurement result of the N first signals, and determine $K_2$ second signals in the M second signals based on the measurement result of the M second signals, where $K_1 \leq N$ and $K_2 \leq M$.

Optionally, in some embodiments, the method further includes:

sending, by the network device, third configuration information to the terminal device, where the third configuration information is used to configure the terminal device to determine K signals in the N first signals and the M second signals based on the measurement result of the N first signals and the measurement result of the M second signals, where $1 \leq K \leq N+M$.

Optionally, in some embodiments, the method further includes:

sending, by the network device, fourth configuration information to the terminal device, where the fourth configuration information is used to configure the terminal device to determine, in the N first signals based on a first determining condition and the measurement result of the N first signals, a first signal that needs to be reported, and determine, in the M second signals based on a second determining condition and the measurement result of the M second signals, a second signal that needs to be reported.

Optionally, in some embodiments, the first determining condition includes that: a measurement result is greater than or greater than or equal to a first threshold, or a difference between a measurement result and a maximum value of the measurement result of the N first signals is less than or less than or equal to a first difference; and the second determining condition includes that: a measurement result is greater than or greater than or equal to a second threshold, or a difference between a measurement result and a maximum value of the measurement result of the M second signals is less than or less than or equal to a second difference.

Optionally, in some embodiments, the method further includes:

sending, by the network device, fifth configuration information to the terminal device, where the fifth configuration information is used to configure the terminal device to determine, in the N first signals and the M second signals based on a third determining condition, the measurement result of the N first signals, and the measurement result of the M second signals, signals that need to be reported.

Optionally, in some embodiments, the third determining condition includes that: a measurement result is greater than or greater than or equal to a third threshold, or a difference between a measurement result and a maximum value of the measurement result of the N first signals and the measurement result of the M second signals is less than or less than or equal to a third difference.

The foregoing describes the method embodiments of this application in detail with reference to FIG. 2 and FIG. 3. The following describes apparatus embodiments of this application in detail with reference to FIG. 4 to FIG. 7. It should be understood that, the apparatus embodiments mutually correspond to the method embodiments. For similar descriptions, refer to the method embodiments.

Figure 4:
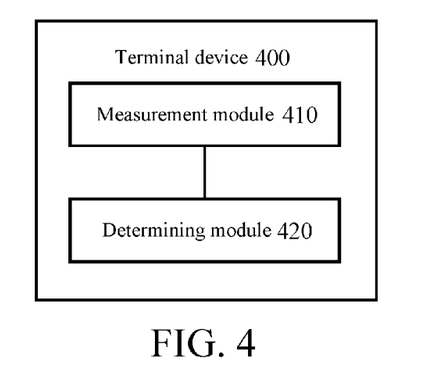
FIG. 4 is a schematic block diagram of a terminal device according to an embodiment of this application.

FIG. 4 is a schematic block diagram of a terminal device 400 according to an embodiment of this application. As shown in FIG. 4, the terminal device 400 includes:

a measurement module 410, configured to: measure N first signals to obtain a corresponding measurement result, and measure M second signals, to obtain a corresponding measurement result where N≥1 and M≥1; and a determining module 420, configured to determine, based on the measurement result of the N first signals and the measurement result of the M second signals, signals that need to be reported.

Optionally, in some embodiments, the terminal device 400 further includes:

a first receiving module, configured to receive first configuration information sent by a network device, where the first configuration information is used to configure the terminal device to measure the first signals and the second signals.

Optionally, in some embodiments, the determining module 420 is specifically configured to:

determine $K_1$ first signals in the N first signals based on the measurement result of the N first signals, and determine $K_2$ second signals in the M second signals based on the measurement result of the M second signals, where the signals that need to be reported include the $K_1$ first signals and the $K_2$ second signals.

Optionally, in some embodiments, the terminal device 400 further includes:

a second receiving module, configured to receive second configuration information sent by the network device, where the second configuration information is used to configure the terminal device to determine the $K_1$ first signals in the N first signals based on the measurement result of the N first signals, and determine the $K_2$ second signals in the M second signals based on the measurement result of the M second signals, where $K_1 \leq N$ and $K_2 \leq M$.

Optionally, in some embodiments, the determining module 420 is specifically configured to:

determine K signals in the N first signals and the M second signals based on the measurement result of the N first signals and the measurement result of the M second signals, where $1 \leq K \leq N+M$, and the signals that need to be reported include the K second signals.

Optionally, in some embodiments, the terminal device 400 further includes:

a third receiving module, configured to receive third configuration information sent by the network device, where the third configuration information is used to configure the terminal device to determine the K signals in the N first signals and the M second signals based on the measurement result of the N first signals and the measurement result of the M second signals, where $1 \leq K \leq N+M$.

Optionally, in some embodiments, the determining module 420 is specifically configured to:

determine $K_1$ first signals in the N first signals based on a first determining condition and the measurement result of the N first signals, and determine $K_2$ second signals in the M second signals based on a second determining condition and the measurement result of the M second signals, where $K_1 \leq N$, $K_2 \leq M$, and the signals that need to be reported include the $K_1$ first signals and the $K_2$ second signals.

Optionally, in some embodiments, the terminal device 400 further includes:

a fourth receiving module, configured to receive fourth configuration information sent by the network device, where the fourth configuration information is used to configure the terminal device to determine, in the N first signals based on the first determining condition and the measurement result of the N first signals, a first signal that needs to be reported, and determine, in the M second signals based on the second determining condition and the measurement result of the M second signals, a second signal that needs to be reported.

Optionally, in some embodiments, the first determining condition includes that: a measurement result is greater than or greater than or equal to a first threshold, or a difference between a measurement result and a maximum value of the measurement result of the N first signals is less than or less than or equal to a first difference; and the second determining condition includes that: a measurement result is greater than or greater than or equal to a second threshold, or a difference between a measurement result and a maximum value of the measurement result of the M second signals is less than or less than or equal to a second difference.

Optionally, in some embodiments, the determining module 420 is further configured to:

determine K second signals in the N first signals and the M second signals based on a third determining condition, the measurement result of the N first signals, and the measurement result of the M second signals, where 1≤K≤N+M, and the signals that need to be reported include the K second signals.

Optionally, in some embodiments, the terminal device 400 further includes:

a fifth receiving module, configured to receive fifth configuration information sent by the network device, where the fifth configuration information is used to configure the terminal device to determine, in the N first signals and the M second signals based on the third determining condition, the measurement result of the N first signals, and the measurement result of the M second signals, the signals that need to be reported.

Optionally, in some embodiments, the third determining condition includes that: a measurement result is greater than or greater than or equal to a third threshold, or a difference between a measurement result and a maximum value of the measurement result of the N first signals and the measurement result of the M second signals is less than or less than or equal to a third difference.

Optionally, in some embodiments, the terminal device 400 further includes:

a processing module, configured to perform joint processing on the measurement result of the at least one first signal and the measurement result of the at least one second signal to obtain a processed measurement result, where the processed measurement result is a measurement result corresponding to the first signal and the second signal.

Optionally, in some embodiments, the processing module is specifically configured to:

determine a maximum value of the measurement result of the at least one first signal and the measurement result of the at least one second signal as the processed measurement result.

Optionally, in some embodiments, the processing module is specifically configured to:

determine, by the terminal device, a minimum value of the measurement result of the at least one first signal and the measurement result of the at least one second signal as the processed measurement result.

Optionally, in some embodiments, the processing module is specifically configured to:

determine, by the terminal device, that the processed measurement result is $a*R_1+b*R_2$, where a>0, b>0, $R_1$ is the measurement result of the first signal, and $R_2$ is the measurement result of the second signal.

Optionally, in some embodiments, a and b are configured for the terminal device by the network device, are determined by the terminal device, or are preset on the terminal device.

Optionally, in some embodiments, a and b are determined based on at least one of the following: signal bandwidth, signal periods, signal density, resource element RE quantities, or sample quantities of the at least one first signal and the at least one second signal.

Optionally, in some embodiments, the first signal and the second signal have a quasi-co-location QCL or a spatial quasi-co-location.

Optionally, in some embodiments, the determining module 420 is specifically configured to:

determine, based on the processed measurement result, the signals that need to be reported.

Optionally, in some embodiments, the terminal device 400 further includes:

a processing module, configured to adjust the measurement result of the N first signals and the measurement result of the M second signals based on transmit power of the N first signals and transmit power of the M second signals; and the determining module 420 is specifically configured to:

determine, based on the adjusted measurement result of the N first signals and the adjusted measurement result of the M second signals, the signals that need to be reported.

Optionally, in some embodiments, the determining module 420 is specifically configured to:

compare the adjusted measurement result of the N first signals with the adjusted measurement result of the M second signals, to determine that K signals having optimal quality are the signals that need to be reported, where 1≤K≤N+M.

Optionally, in some embodiments, the processing module is further configured to:

process some or all of the adjusted measurement result of the N first signals and the adjusted measurement result of the M second signals; and the determining module 420 is specifically configured to:

determine, based on the processed measurement result of the N first signals and the processed measurement result of the M second signals, the signals that need to be reported.

Optionally, in some embodiments, the processing module is specifically configured to:

multiply a first measurement result by a first coefficient, or add a first offset to the first measurement result, where the first measurement result is any measurement result of the adjusted measurement result of the N first signals, or any measurement result of the adjusted measurement result of the M second signals.

Optionally, in some embodiments, the first coefficient is preset on the terminal device, is configured for the terminal device by the network device, or is determined by the terminal device.

Optionally, in some embodiments, the first offset is preset on the terminal device, is configured for the terminal device by the network device, or is determined by the terminal device.

Optionally, in some embodiments, the measurement result is reference signal received power RSRP.

Optionally, in some embodiments, the first signals are channel state information-reference signals CSI-RSs, and the second signals are some or all signals in a synchronization signal block SS Block.

It should be understood that, the terminal device 400 in this embodiment of this application may correspond to the terminal device in the method embodiments of this application, and the foregoing operations and/or functions and another operation and/or function of the units in the terminal device 400 are respectively for implementing corresponding procedures of the terminal device in the method 200 shown in FIG. 2. For brevity, details are not described herein again.

Figure 5:
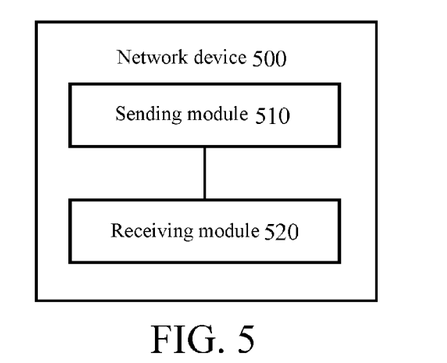
FIG. 5 is a schematic block diagram of a network device according to an embodiment of this application.

FIG. 5 is a schematic block diagram of a network device 500 according to an embodiment of this application. As shown in FIG. 5, the network device 500 includes:

a sending module 510, configured to send first configuration information to a terminal device, where the first configuration information is used to configure the terminal device to measure a first signal and a second signal; and a receiving module 520, configured to receive a reporting result sent by the terminal device, where the reporting result includes information about a signal determined by the terminal device based on a measurement result of N first signals and a measurement result of M second signals, where N≥1 and M≥1.

Optionally, in some embodiments, the sending module 510 is further configured to:

send second configuration information to the terminal device, where the second configuration information is used to configure the terminal device to determine $K_1$ first signals in the N first signals based on the measurement result of the N first signals, and determine $K_2$ second signals in the M second signals based on the measurement result of the M second signals, where $K_1 \leq N$ and $K_2 \leq M$.

Optionally, in some embodiments, the sending module 510 is further configured to:

send third configuration information to the terminal device, where the third configuration information is used to configure the terminal device to determine K signals in the N first signals and the M second signals based on the measurement result of the N first signals and the measurement result of the M second signals, where 1≤K≤N+M.

Optionally, in some embodiments, the sending module 510 is further configured to:

send fourth configuration information to the terminal device, where the fourth configuration information is used to configure the terminal device to determine, in the N first signals based on a first determining condition and the measurement result of the N first signals, a first signal that needs to be reported, and determine, in the M second signals based on a second determining condition and the measurement result of the M second signals, a second signal that needs to be reported.

Optionally, in some embodiments, the first determining condition includes that: a measurement result is greater than or greater than or equal to a first threshold, or a difference between a measurement result and a maximum value of the measurement result of the N first signals is less than or less than or equal to a first difference; and the second determining condition includes that: a measurement result is greater than or greater than or equal to a second threshold, or a difference between a measurement result and a maximum value of the measurement result of the M second signals is less than or less than or equal to a second difference.

Optionally, in some embodiments, the sending module 510 is further configured to:

send fifth configuration information to the terminal device, where the fifth configuration information is used to configure the terminal device to determine, in the N first signals and the M second signals based on a third determining condition, the measurement result of the N first signals, and the measurement result of the M second signals, signals that need to be reported.

Optionally, in some embodiments, the third determining condition includes that: a measurement result is greater than or greater than or equal to a third threshold, or a difference between a measurement result and a maximum value of the measurement result of the N first signals and the measurement result of the M second signals is less than or less than or equal to a third difference.

It should be understood that, the network device 500 in this embodiment of this application may correspond to the network device in the method embodiments of this application, and the foregoing operations and/or functions and another operation and/or function of the units in the network device 500 are respectively for implementing corresponding procedures of the network device in the method 300 shown in FIG. 3. For brevity, details are not described herein again.

Figure 6:
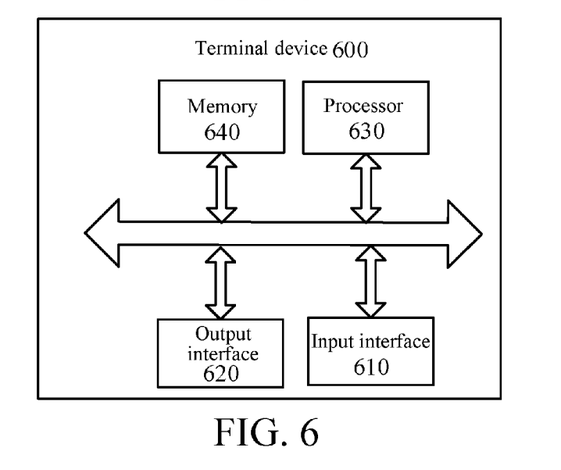
FIG. 6 is a schematic block diagram of a terminal device according to another embodiment of this application.

As shown in FIG. 6, an embodiment of this application further provides a terminal device 600. The terminal device 600 may be the terminal device 400 in FIG. 4, and can be configured to perform content of the terminal device corresponding to the method 200 in FIG. 2. The terminal device 600 includes: an input interface 610, an output interface 620, a processor 630, and a memory 640. The input interface 610, the output interface 620, the processor 630, and the memory 640 may be connected to each other by using a bus system. The memory 640 is configured to store a program, an instruction, code, or the like. The processor 630 is configured to execute the program, the instruction, the code in the memory 640, to control the input interface 610 to receive a signal, and control the output interface 620 to send a signal and perform an operation in the foregoing method embodiments.

It should be understood that, in this embodiment of this application, the processor 630 may be a central processing unit (Central Processing Unit, "CPU" for short), and the processor 630 may further be another general processor, a digital signal processor (DSP), an application-specific integrated circuit (ASIC), a field programmable gate array (FPGA), another programmable logic device, a transistor logic device, a discrete gate, a transistor logic device, a discrete hardware component, or the like. The general-purpose processor may be a microprocessor, or the processor may be any conventional processor or the like.

The memory 640 may include a ROM and a RAM, and provides an instruction and data to the processor 630. A part of the memory 640 may further include a non-volatile random access memory. For example, the memory 640 may further store device type information.

In an implementation process, each piece of content in the foregoing methods can be implemented by using a hardware integrated logical circuit in the processor 630, or by using instructions in a form of software. Content of the methods disclosed with reference to the embodiments of this application may be directly performed and completed by using a hardware processor, or may be performed and completed by using a combination of hardware and a software module in the processor. The software module may be located in a mature storage medium in the art, such as a RAM, a flash memory, a ROM, a programmable ROM, an electrically erasable programmable memory, or a register. The storage medium is located in the memory 640, and the processor 630 reads information in the memory 640 and completes the content in the foregoing methods in combination with hardware of the processor. To avoid repetition, details are not described herein again.

In a specific implementation, the first receiving module, the second receiving module, the third receiving module, the fourth receiving module, and the fifth receiving module in the terminal device 400 shown in FIG. 4 may be implemented by using the input interface 610 and the output interface 620 in FIG. 6. The measurement module 410, the determining module 420, and the processing module in the terminal device 400 shown in FIG. 4 may be implemented by using the processor 630 in FIG. 6.

Figure 7:
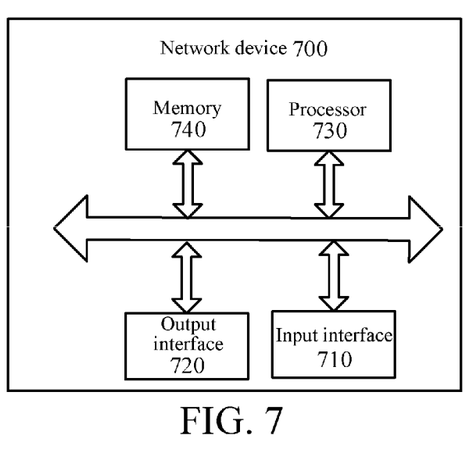
FIG. 7 is a schematic block diagram of a network device according to another embodiment of this application.

As shown in FIG. 7, an embodiment of this application further provides a network device 700. The network device 700 may be the network device 500 in FIG. 5, and can be configured to perform content of the network device corresponding to the method 300 in FIG. 3. The network device 700 includes: an input interface 710, an output interface 720, a processor 730, and a memory 740. The input interface 710, the output interface 720, the processor 730, and the memory 740 may be connected to each other by using a bus system. The memory 740 is configured to store a program, an instruction, code, or the like. The processor 730 is configured to execute the program, the instruction, the code in the memory 740, to control the input interface 710 to receive a signal, and control the output interface 720 to send a signal and perform an operation in the foregoing method embodiments.

It should be understood that, in this embodiment of this application, the processor 730 may be a central processing unit (Central Processing Unit, "CPU" for short), and the processor 730 may further be another general processor, a digital signal processor (DSP), an application-specific integrated circuit (ASIC), a field programmable gate array (FPGA), another programmable logic device, a transistor logic device, a discrete gate, a transistor logic device, a discrete hardware component, or the like. The general-purpose processor may be a microprocessor, or the processor may be any conventional processor or the like.

The memory 740 may include a ROM and a RAM, and provides an instruction and data to the processor 730. A part of the memory 740 may further include a non-volatile random access memory. For example, the memory 740 may further store device type information.

In an implementation process, each piece of content in the foregoing methods can be implemented by using a hardware integrated logical circuit in the processor 730, or by using instructions in a form of software. Content of the methods disclosed with reference to the embodiments of this application may be directly performed and completed by using a hardware processor, or may be performed and completed by using a combination of hardware and a software module in the processor. The software module may be located in a mature storage medium in the art, such as a RAM, a flash memory, a ROM, a programmable ROM, an electrically erasable programmable memory, or a register. The storage medium is located in the memory 740, and the processor 730 reads information in the memory 740 and completes the content in the foregoing methods in combination with hardware of the processor. To avoid repetition, details are not described herein again.

In a specific implementation, the sending module 510 in the network device 500 shown in FIG. 5 may be implemented by using the output interface 720 in FIG. 7, and the receiving module 520 in the network device 500 may be implemented by using the input interface 710 in FIG. 7.

Persons of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. Persons skilled in the art may use different methods to implement the described functions for each particular application, but it should not be considered that the implementation goes beyond the scope of this application.

It may be clearly understood by persons skilled in the art that for convenience and brevity of description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and the parts displayed as units may or may not be physical units, may be located at one position, or may be distributed on a plurality of network units. Some of or all of the units may be selected according to actual needs to achieve the objectives of the solutions of the embodiments.

In addition, functional units in the embodiments of this application may be integrated into one processing unit, or each of the units may exist alone physically, or two or more units may be integrated into one unit.

When the functions are implemented in the form of software functional units and sold or used as independent products, the functions may be stored in a computer-readable storage medium. Based on such an understanding, the technical solutions of this application essentially, or the part contributing to the existing technology, or some of the technical solutions may be implemented in the form of a software product. The software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a USB flash memory drive, a removable hard disk, a read-only memory (ROM, Read-Only Memory), a random access memory (RAM, Random Access Memory), a magnetic disk, or an optical disc.

The descriptions are only specific implementations of this application, but are not intended to limit the protection scope of this application. Any variation or replacement readily figured out by persons skilled in the art within the technical scope disclosed in this application shall fall within the protection scope of this application. Therefore, the protection scope of this application shall be subject to the protection scope of the claims.

What is claimed is:

1. A signal reporting method, comprising:
    measuring, by a terminal device, N first signals to obtain a corresponding measurement result, and measuring M second signals to obtain a corresponding measurement result, wherein N≥1 and M≥1, the first signals are channel state information-reference signals (CSI-RSs), and the second signals are some or all signals in a synchronization signal block (SS Block); and
    determining, by the terminal device based on the measurement result of the N first signals and the measurement result of the M second signals, signals that need to be reported;
    wherein the method further comprises:
    performing, by the terminal device, joint processing on the measurement result of the at least one first signal and the measurement result of the at least one second signal to obtain a processed measurement result, wherein the processed measurement result is a measurement result corresponding to the first signal and the second signal;
    wherein the determining, by the terminal device based on the measurement result of the N first signals and the measurement result of the M second signals, signals that need to be reported comprises:
    determining, by the terminal device, K signals in the N first signals and the M second signals based on the measurement result of the N first signals and the measurement result of the M second signals, wherein 1≤K≤N+M, and the signals that need to be reported comprise the K second signals.

2. The method according to claim 1, wherein the method further comprises:
    receiving, by the terminal device, first configuration information sent by a network device, wherein the first configuration information is used to configure the terminal device to measure the first signals and the second signals.

3. The method according to claim 1, wherein the first signal and the second signal have a quasi-co-location QCL or a spatial quasi-co-location.

4. The method according to claim 1, wherein the determining, by the terminal device based on the measurement result of the N first signals and the measurement result of the M second signals, signals that need to be reported further comprises:
    determining, by the terminal device based on the processed measurement result, the signals that need to be reported.

5. The method according to claim 1, wherein the measurement result is reference signal received power RSRP.

6. A terminal device, comprising:
    a processor, configured to:
        measure N first signals to obtain a corresponding measurement result, and measure M second signals to obtain a corresponding measurement result, wherein N≥1 and M≥1, the first signals are channel state information-reference signals (CSI-RSs), and the second signals are some or all signals in a synchronization signal block (SS Block); and
        determine, based on the measurement result of the N first signals and the measurement result of the M second signals, signals that need to be reported;
    wherein the processor is further configured to:
    perform joint processing on the measurement result of the at least one first signal and the measurement result of the at least one second signal to obtain a processed measurement result, wherein the processed measurement result is a measurement result corresponding to the first signal and the second signal;
    wherein the processor is specifically configured to:
    determine K signals in the N first signals and the M second signals based on the measurement result of the N first signals and the measurement result of the M second signals, wherein 1≤K≤N+M, and the signals that need to be reported comprise the K second signals.

7. The terminal device according to claim 6, wherein the terminal device further comprises:
    an input interface, configured to receive first configuration information sent by a network device, wherein the first configuration information is used to configure the terminal device to measure the first signals and the second signals.

8. The terminal device according to claim 6, wherein the first signal and the second signal have a quasi-co-location QCL or a spatial quasi-co-location.

9. The terminal device according to claim 6, wherein the processor is further configured to:
    determine, based on the processed measurement result, the signals that need to be reported.

10. The terminal device according to claim 6, wherein the measurement result is reference signal received power RSRP.

* * * * *